(12) United States Patent
Strijker et al.

(10) Patent No.: US 10,128,766 B1
(45) Date of Patent: Nov. 13, 2018

(54) METHOD AND APPARATUS FOR BI-DIRECTIONAL SWITCHED MODE POWER SUPPLY WITH FIXED FREQUENCY OPERATION

(71) Applicant: NXP B.V., Eindhoven (NL)

(72) Inventors: Joan Wichard Strijker, Wijchen (NL); Jeroen Kleinpenning, Lent (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/689,672

(22) Filed: Aug. 29, 2017

(51) Int. Cl.
  *H02M 3/335* (2006.01)
  *H02M 7/538* (2007.01)
  *H02M 3/156* (2006.01)
  *H02J 7/00* (2006.01)
  *H02J 9/06* (2006.01)
  *H02M 3/337* (2006.01)

(52) U.S. Cl.
  CPC ....... *H02M 3/33584* (2013.01); *H02J 7/0068* (2013.01); *H02J 9/062* (2013.01); *H02M 3/156* (2013.01); *H02M 3/337* (2013.01); *H02M 7/538* (2013.01)

(58) Field of Classification Search
  CPC .. H02M 3/33584; H02M 3/337; H02M 3/156; H02M 7/538; H02J 7/0068; H02J 9/062
  See application file for complete search history.

(56) References Cited

U.S. PATENT DOCUMENTS

| | | | |
|---|---|---|---|
| 6,084,784 A | 7/2000 | Durbaum | |
| 6,201,714 B1 * | 3/2001 | Liang | H02M 3/33576 323/268 |
| 7,046,525 B2 * | 5/2006 | Smidt | H02M 3/33576 363/16 |
| 9,287,788 B2 * | 3/2016 | Harrison | H02M 3/33592 |
| 2005/0270001 A1 * | 12/2005 | Jitaru | H02M 3/33584 323/247 |
| 2018/0115252 A1 * | 4/2018 | Chang | H02M 3/33592 |

FOREIGN PATENT DOCUMENTS

WO  WO-2004/030193 A1  4/2004

* cited by examiner

*Primary Examiner* — Emily P Pham

(57) ABSTRACT

Various embodiments relate to a method and circuit for maintaining zero voltage switching while having a fixed switching frequency, the method including switching on a first switch, on a primary side, at a beginning of a primary stroke of a time period at zero voltage and switching off the first switch at an end of the primary stroke, switching on a second switch, on a secondary side, at a beginning of a secondary stroke of a time period and switching off the second switch at an end of the secondary stoke of a time period and switching on a second switch at a beginning of a ringing period of the time period and switching off the second switch at an end of a bi-directional flyback action.

21 Claims, 17 Drawing Sheets

METHOD AND APPARATUS FOR BI-DIRECTIONAL SWITCHED MODE POWER SUPPLY WITH FIXED FREQUENCY OPERATION

TECHNICAL FIELD

This disclosure relates generally to power supply with bi-directional power conversion, and more specifically, but not exclusively, to maintaining zero voltage switching while having a fixed switching frequency.

BACKGROUND

FIG. 1 illustrates an isolated flyback Switch Mode Power Supply ("SMPS") 100. The AC mains 101 supply the isolated flyback SMPS 100 and the AC mains 101 is connected via a bridge rectifier 102, which includes diodes D1 103, D2 104, D3 105 and D4 106, to an input capacitor C1 107.

SMPS control IC1 108 drives MOSFET switch S1 109. Through transformer T1 110, the energy is transferred to the output capacitor C2 111, using the Synchronous Rectifier ("SR") MOSFET S2 112. MOSFET S2 112 is driven by the secondary side controller IC2 113. The output voltage 114 is controlled by secondary side controller IC2 113 using signal transformer T2 115.

The input side and the output side are electrically isolated by transformer T1 110 and transformer T2 115.

In a flyback converter, MOSFET S1 109 is switched on and energy is stored in transformer T1 110 during the primary stroke.

During the secondary stroke, MOSFET S2 112 is switched on and the energy is released to the secondary side.

FIG. 2 illustrates a timing diagram 200 showing the gate signals 201 of MOSFET S1 109 and gate signals 202 of MOSFET S2 112 with the drain1 signal 203, drain2 signal 205 and the current through MOSFET S2 112, Idrain2 204.

To achieve Zero Voltage Switching ("ZVS") for the primary side switch MOSFET S1 109, the secondary side switch MOSFET S2 112 may be controlled by IC2 113.

Using IC2 113 to control MOSFET S2 112, FIG. 2 illustrates a timing diagram 200 for Discontinuous Conduction Mode ("DCM") operation. During this operation, MOSFET S2 112 is switched on for a second time after the secondary stroke. During the conduction time (i.e. the Bi-directional Flyback Action ("bidifly action") with the secondary current flowing in the opposite direction), energy is built up in transformer T1 110, which is released when MOSFET S2 112 is switched off. The energy in transformer T1 110 causes the drain node on the primary side, drain1 203, to drop to (almost) zero, after switch MOSFET S1 109 is switched on for the next cycle.

Using IC2 113 to control, FIG. 3 illustrates a timing diagram 300 for Quasi Resonant ("QR") operation. During this operation, MOSFET S2 112 is kept in an on-state after the secondary stroke has ended. During the additional conduction time, energy is built up in transformer T1 110 which is released at the moment MOSFET S2 112 is switched off. The energy in transformer T1 110 causes the drain node on the primary side, drain1 301, to drop to (almost) zero, after which MOSFET S1 109 is switched on for the next cycle.

Switching on MOSFET S2 112 in the top of the drain1 301 signal is necessary because MOSFET S2 112 then switches on with ZVS. If MOSFET S2 112 must be switched on at the top of the drain1 203 signal, the moments to switch on MOSFET S2 112 for the second time may not be chosen freely as the tops of the drain1 203 signal appear at discrete time moments.

For ZVS, MOSFET S1 109 must be switched on after the bidifly action and at the moment the valley is reached for the drain1 301 signal.

If MOSFET S1 109 is switched on in the valley and MOSFET S2 112 is switched on at a top (or kept conductive after the secondary stroke), the time period, Tperiod 302, and thus the switching frequency (1/Tperiod) is dependent on the output power.

FIG. 4 illustrates a graph 400 of frequency versus output power curves. For a flyback SMPS, where the maximum frequency is limited and the Ipeak is variable for maintaining the QR operation, FIG. 4 illustrates the frequency versus output power curves.

FIG. 4 illustrates that it is not possible to maintain ZVS for MOSFET S1 109 and MOSFET S2 112 for any output power, while also having a fixed switching frequency.

Maintaining ZVS and having a fixed switching frequency (i.e. Frequency 1 405) is only possible for output power Power3 403, Power2 402 and Power1 401. However, for output power Power4 404, Frequency2 406 or Frequency3 407 is required.

Therefore, if a fixed frequency operation is needed, for example to limit the interference with a touch-screen controller of a portable device, this control method cannot be used.

In order to operate on a fixed switching frequency, flyback SMPS leave out the bidifly action and do not switch on MOSFET S1 109 in a valley.

FIG. 5 illustrates a timing diagram 500. In FIG. 5, MOSFET S1 109 is switched on while the drain1 501 voltage is not (close to) zero. Although fixed frequency operation is now achieved, switching losses increase.

SUMMARY OF EXEMPLARY EMBODIMENTS

A brief summary of various embodiments is presented below. Embodiments address the need to create a method and apparatus for maintaining zero voltage switching while having a fixed switching frequency.

In order to overcome these and other shortcomings of the prior art and in light of the need to create a method and apparatus for maintaining zero voltage switching while having a fixed switching frequency, a brief summary of various exemplary embodiments is presented. Some simplifications and omissions may be made in the following summary, which is intended to highlight and introduce some aspects of the various exemplary embodiments, but not to limit the scope of the invention.

Detailed descriptions of a preferred exemplary embodiment adequate to allow those of ordinary skill in the art to make and use the inventive concepts will follow in later sections.

Various embodiments described herein relate to a method for maintaining zero voltage switching while having a fixed switching frequency, the method including steps of switching on a first switch, on a primary side, at a beginning of a primary stroke of a time period at zero voltage and switching off the first switch at an end of the primary stroke, switching on a second switch, on a secondary side, at a beginning of a secondary stroke of a time period and switching off the second switch at an end of the secondary stoke of a time period and switching on the second switch at an end of a ringing period of the time period and switching off the second switch at an end of a bi-directional flyback action.

In an embodiment of the present disclosure, the gate of the second switch is on after a first timer trips.

In an embodiment of the present disclosure, the gate of the second switch is reset after a second timer trips.

In an embodiment of the present disclosure, each cycle has a peak current within a predetermined tolerance.

In an embodiment of the present disclosure, each cycle has a fall time which ends the cycle and begins the next cycle and the fall time is the time for the drain voltage of the first switch to reach zero voltage after the bi-directional flyback action.

In an embodiment of the present disclosure, the bi-directional flyback action time is set by a zero voltage switch controller on the secondary side.

In an embodiment of the present disclosure, the first timer is the time period minus the fall time and minus the bi-directional flyback action time.

In an embodiment of the present disclosure, the time period includes the primary stroke, the secondary stroke, the ringing period, and the bi-directional flyback action.

In an embodiment of the present disclosure, the second switch remains on at an end of the secondary stoke of a time period and switches off at an end of the bi-directional flyback action.

Various embodiments described herein relate to a circuit for maintaining zero voltage switching while having a fixed switching frequency, the circuit including a primary side including a first switch configured to switch on at a beginning of a primary stroke of a time period at zero voltage and switch off at an end of the primary stroke, a secondary side including a second switch configured to switch on at a beginning of a secondary stroke of a time period and switching off at an end of the secondary stoke of a time period and the second switch configured to switch on at an end of a ringing period of the time period and switching off at an end of a bi-directional flyback action.

In an embodiment of the present disclosure, the gate of the second switch is on after a first timer trips.

In an embodiment of the present disclosure, the gate of the second switch is reset after a second timer trips.

In an embodiment of the present disclosure, each cycle has a peak current within a predetermined tolerance.

In an embodiment of the present disclosure, each cycle has a fall time which ends the cycle and begins the next cycle and the fall time is the time for the drain voltage of the first switch to reach zero voltage after the bi-directional flyback action.

In an embodiment of the present disclosure, the bi-directional flyback action time is set by a zero voltage switch controller on the secondary side.

In an embodiment of the present disclosure, the first timer is the time period minus the fall time and minus the bi-directional flyback action time.

In an embodiment of the present disclosure, the time period includes the primary stroke, the secondary stroke, the ringing period and the bi-directional flyback action.

In an embodiment of the present disclosure, the second switch remains on at an end of the secondary stoke of a time period and switches off at an end of the bi-directional flyback action.

Various embodiments described herein relate to a circuit for maintaining primary side zero voltage switching while having a fixed switching frequency including a coupled inductor with a first winding and a second winding, the first winding being connected to an input node and the second winding connected to an output node, an input switch connected to the first winding of the coupled inductor, and an output transistor connected to the second winding of the coupled inductor, wherein a control circuit connected to the input and output transistor, the control circuit is configured to generate control signals for the input and output transistor and the control circuit maintains zero voltage switching at the primary side.

In an embodiment of the present disclosure, the control circuit operates with a variable power level.

In an embodiment of the present disclosure, the control circuit allows switching at the secondary side.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

These and other more detailed and specific features are more fully disclosed in the following specification, reference being had to the accompanying drawings, in which.

DETAILED DESCRIPTION OF THE INVENTION

Figure 1:
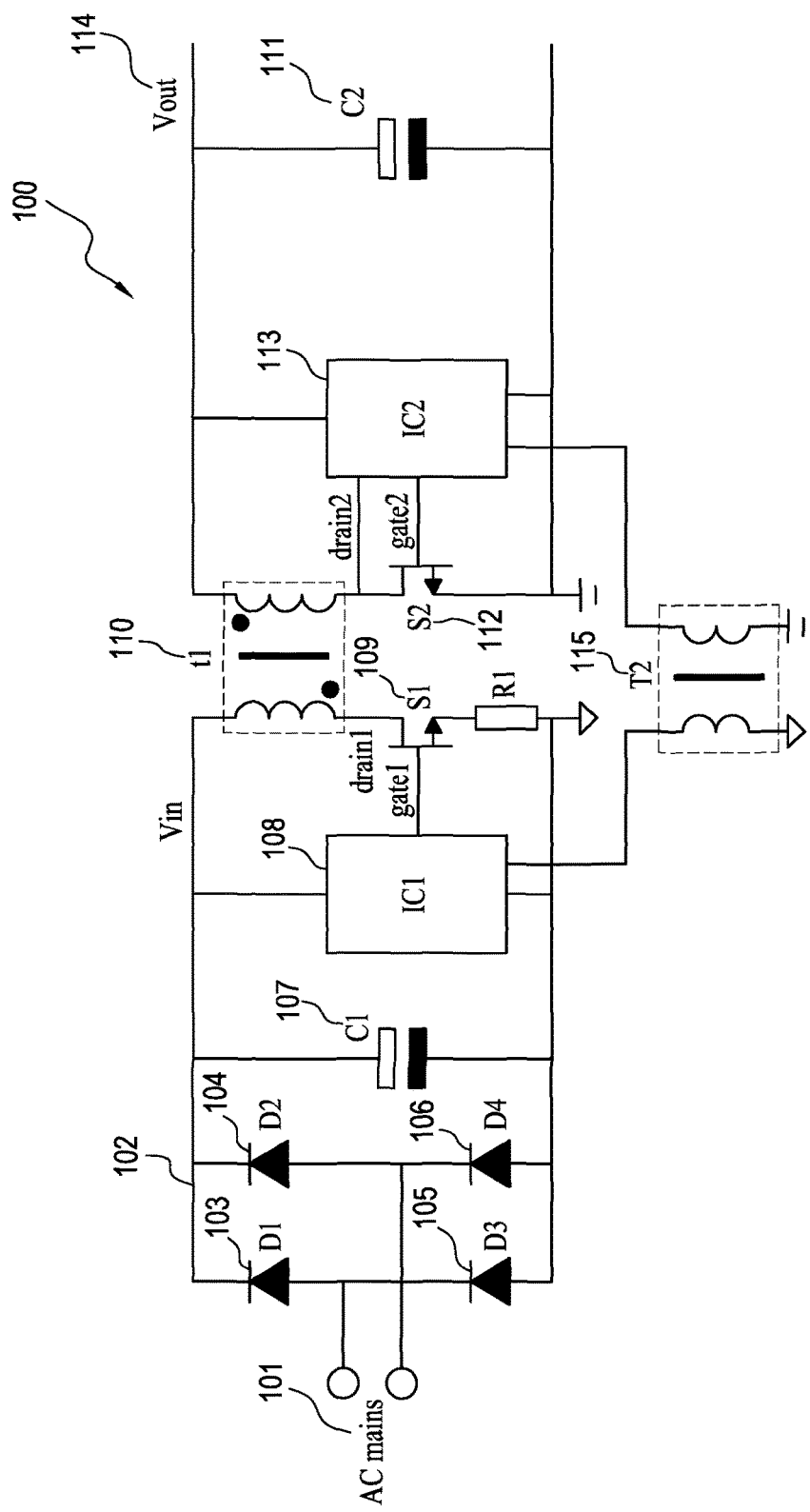
FIG. 1 illustrates a circuit diagram of an isolated flyback Switch Mode Power Supply.
Figure 2:
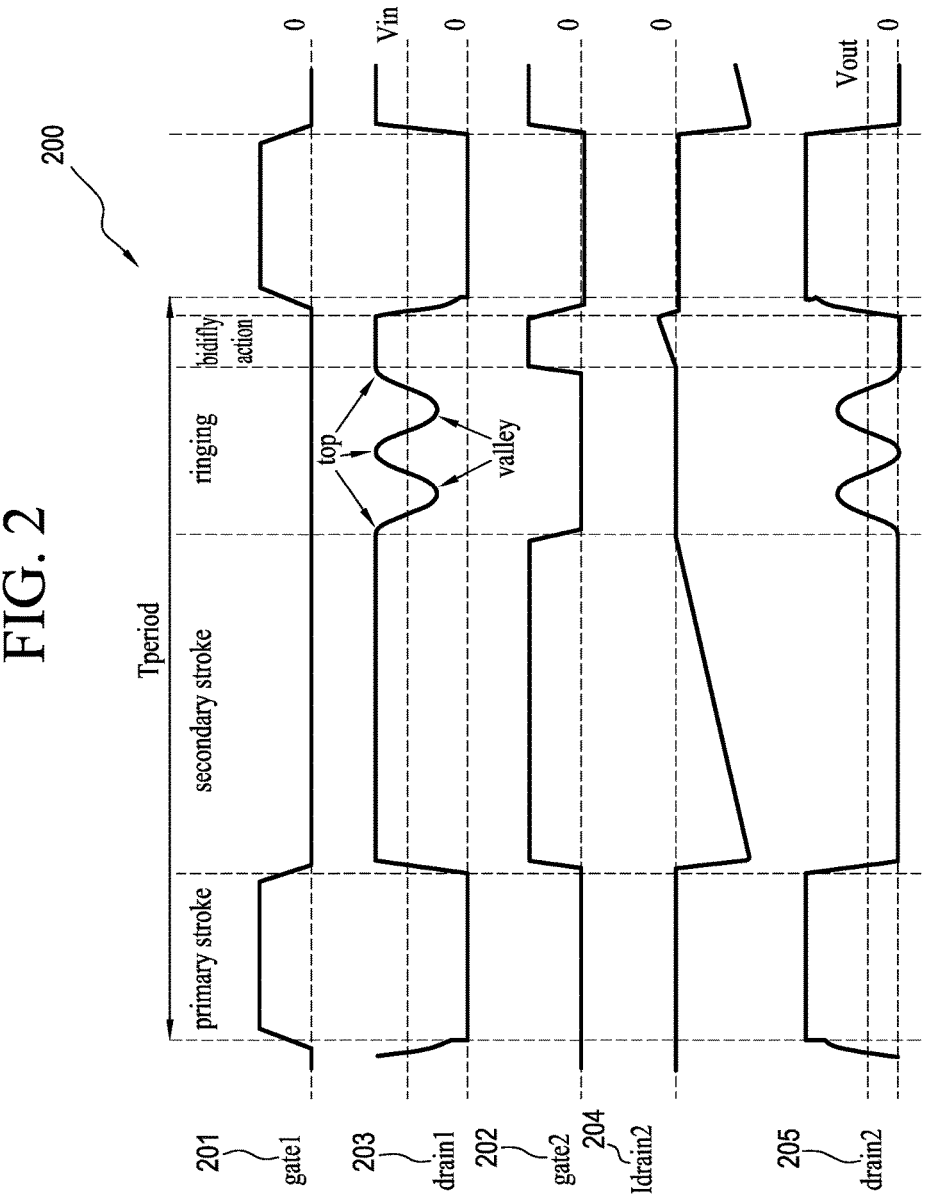
FIG. 2 illustrates a timing diagram for Discontinuous Conduction Mode operation.
Figure 3:
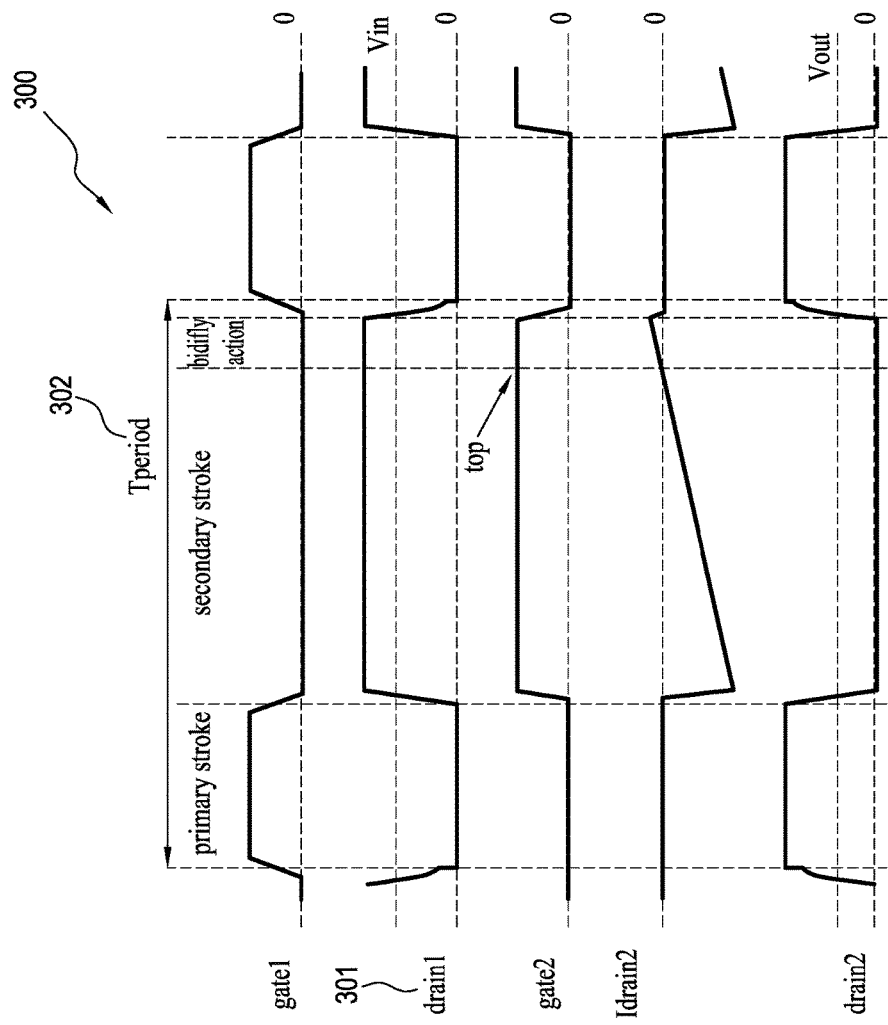
FIG. 3 illustrates a timing diagram for Quasi Resonant operation.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

These embodiments address the need to overcome the limitation of not being able to switch with a fixed, pre-defined frequency, in combination with zero voltage switching.

Figure 4:
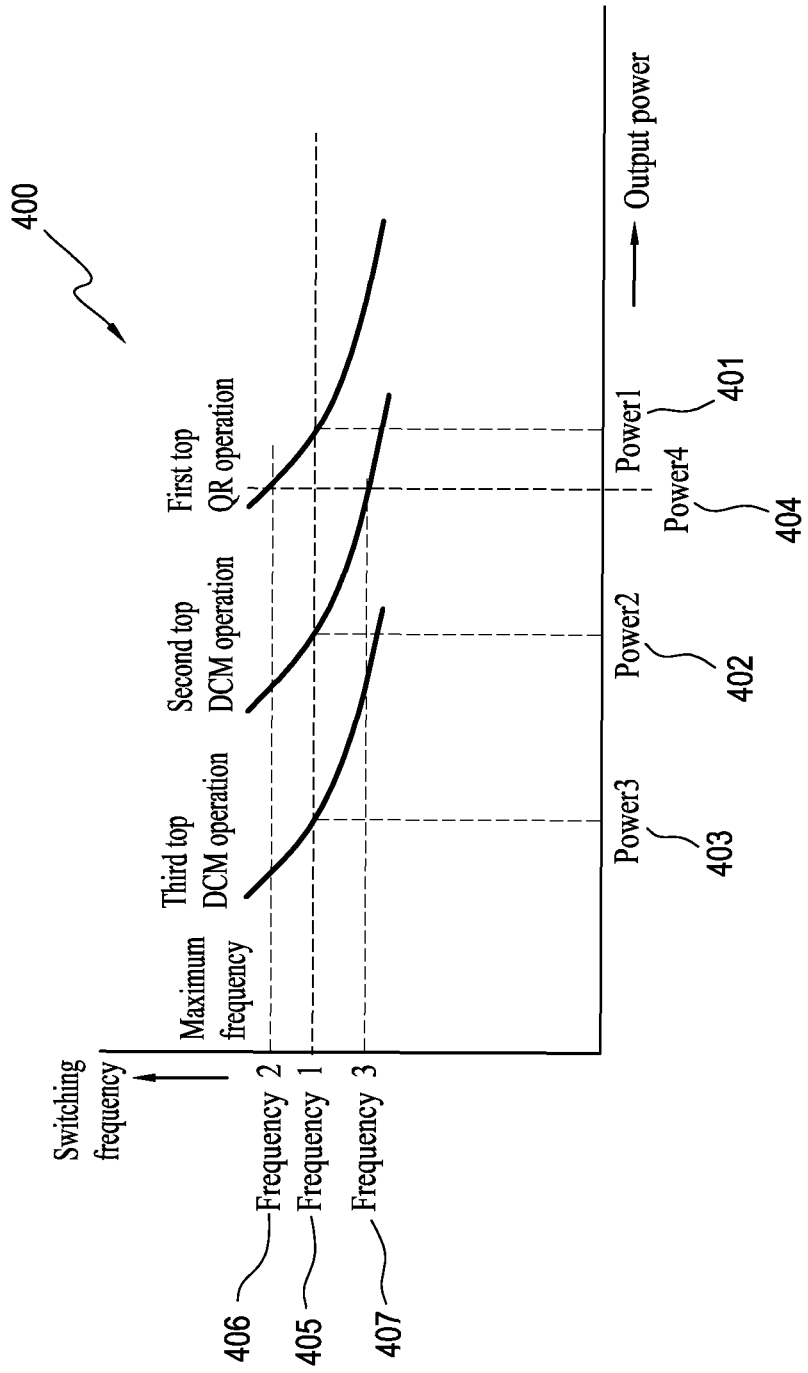
FIG. 4 illustrates a graph of frequency versus output power curves.
Figure 5:
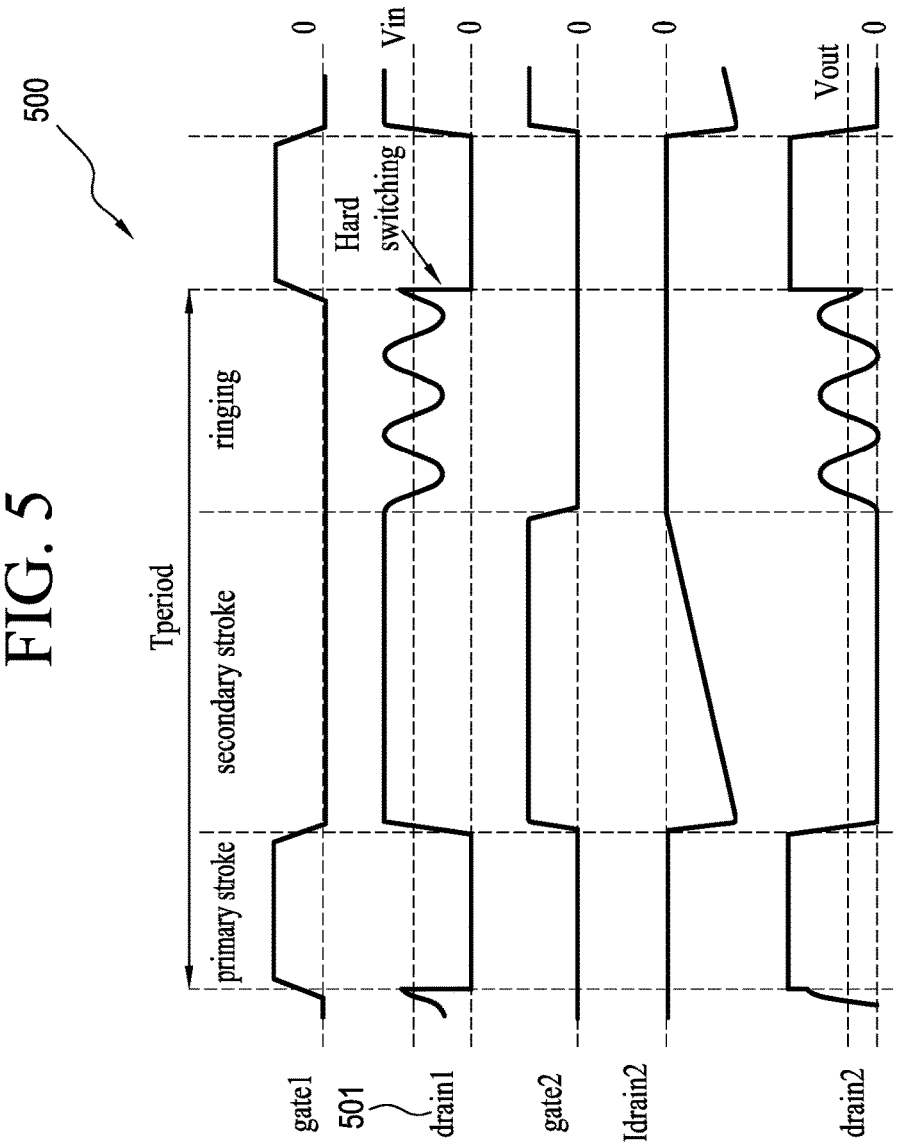
FIG. 5 illustrates a timing diagram for Discontinuous Conduction Mode operation with hard switching at the primary side.

FIG. 4 illustrates that if output power Power4 404 and Frequency 1 405 are required; the SMPS switches alternately at the first and second top.

When switching at the first top Power1 401 is output and when switching on the second top, Power2 402 is output. For an average output power of Power4 404, the SMPS switches n times at the first top and m times at the second top, such that:

$$n*Power1+m*Power2=(n+m)*Power4$$

The average output power is equal to Power4 404.

By using this operation, the efficiency remains optimal because ZVS is maintained for both switches, however, the output voltage ripple increases because for one cycle, the output power of the SMPS does not match the power drain by the load and low frequent hopping between Power1 401 and Power2 402 might generate audible noise.

Therefore, the fundamental frequency becomes 1/(n*T+m*1) and fixed frequency means fixed and constant time between the turning-on moments of the primary switch.

Figure 6:
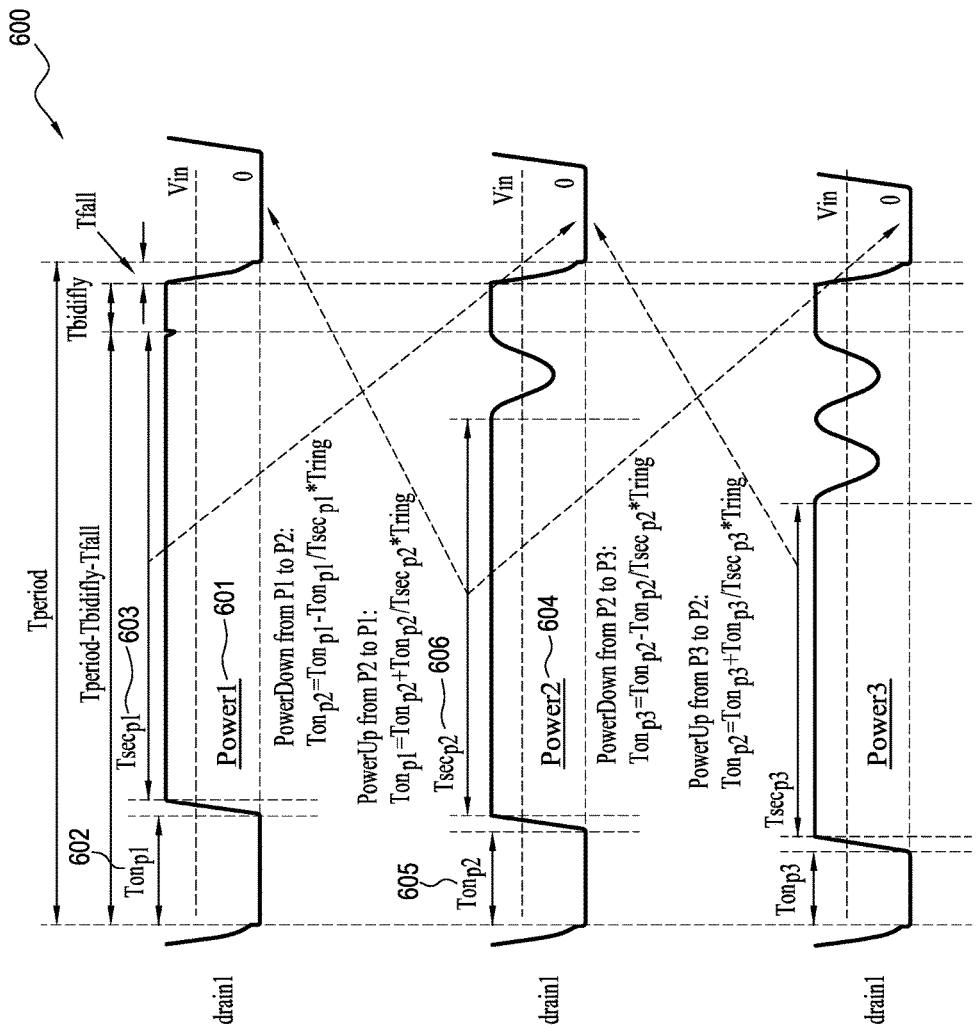
FIG. 6 illustrates a timing diagram for the waveforms of the discrete power levels.

FIG. 6 illustrates a timing diagram 600 for the waveforms of the discrete power levels. Power1 601 is the highest power level with QR operation.

A transition from high power to low power is illustrates by Power1 601 and involves a lower primary on-time ($T_{onp}$) 605, a lower secondary stroke time ($T_{sec}$) and an additional ringing cycle between the secondary stroke and the bidifly stroke such that the total cycle time equals the fixed period time.

A transition from low power to high power is illustrated at Power2 604 and is the inverse of a transition from high power to lower power, meaning an increase of $T_{onp}$ 605 and $T_{sec}$ 606 and the skipping of a ringing cycle.

Figure 7:
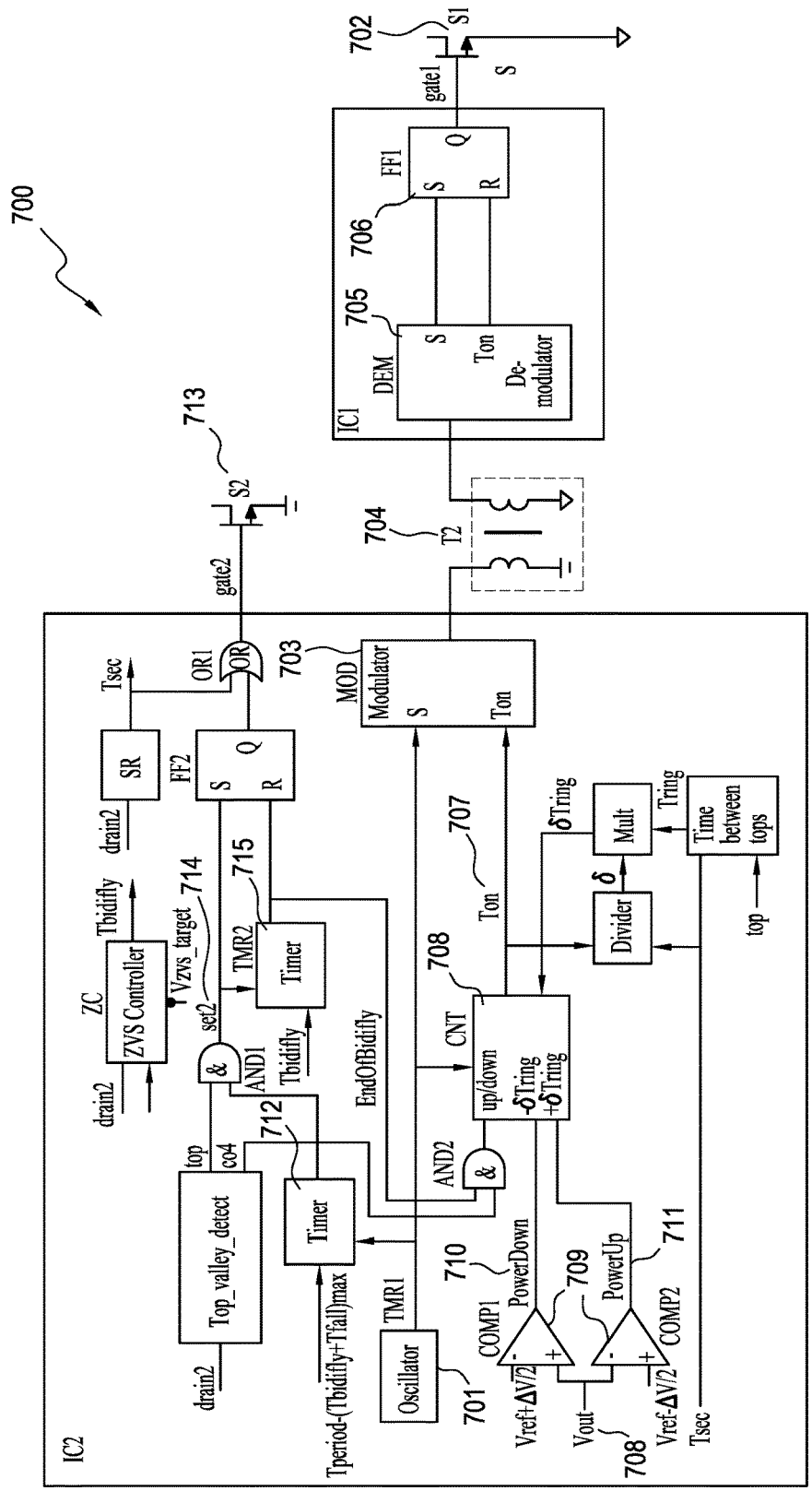
FIG. 7 illustrates a circuit diagram for a first embodiment.

FIG. 7 illustrates a circuit diagram 700 for a first embodiment.

The oscillator 701 determines the fixed frequency.

The primary power switch MOSFET S1 702 is turned on at each start of a new cycle by the modulator MOD 703, the signal transformer T2 704, the demodulator DEM 705 and the flip-flop FF1 706. The primary switch MOSFET S1 702 is turned off by the on-time control. The Ton value 707 is the output of counter CNT 708.

The output voltage 708 is controlled by a window comparator 709 with a ΔV regulation band as follows:

PowerDown 710 will become high if the output voltage exceeds the upper limit of the window and the next on-time will be reduced for lower power: $Ton_{N+1}=Ton_N-\delta Tring$.

PowerUp 711 will become high if the output voltage drops below the bottom limit of the window and the next on-time will be increased for higher power: $Ton_{N+1}=Ton_N+\delta Tring$.

The on-time control is constant, if the output voltage 708 remains within the voltage window.

The parameter δ is the division between the primary on-time and the secondary stroke time, which is different than Ton/Tcycle.

The ZVS controller 700 defines the bidifly stroke time, Tbidifly. The bidifly stroke starts at the first top after release of timer TMR1 712. The secondary switch MOSFET S2 713 is turned by the set2 pulse 714 and is turned off when timer TMR2 715 expires, after the Tbidifly.

Figure 8:
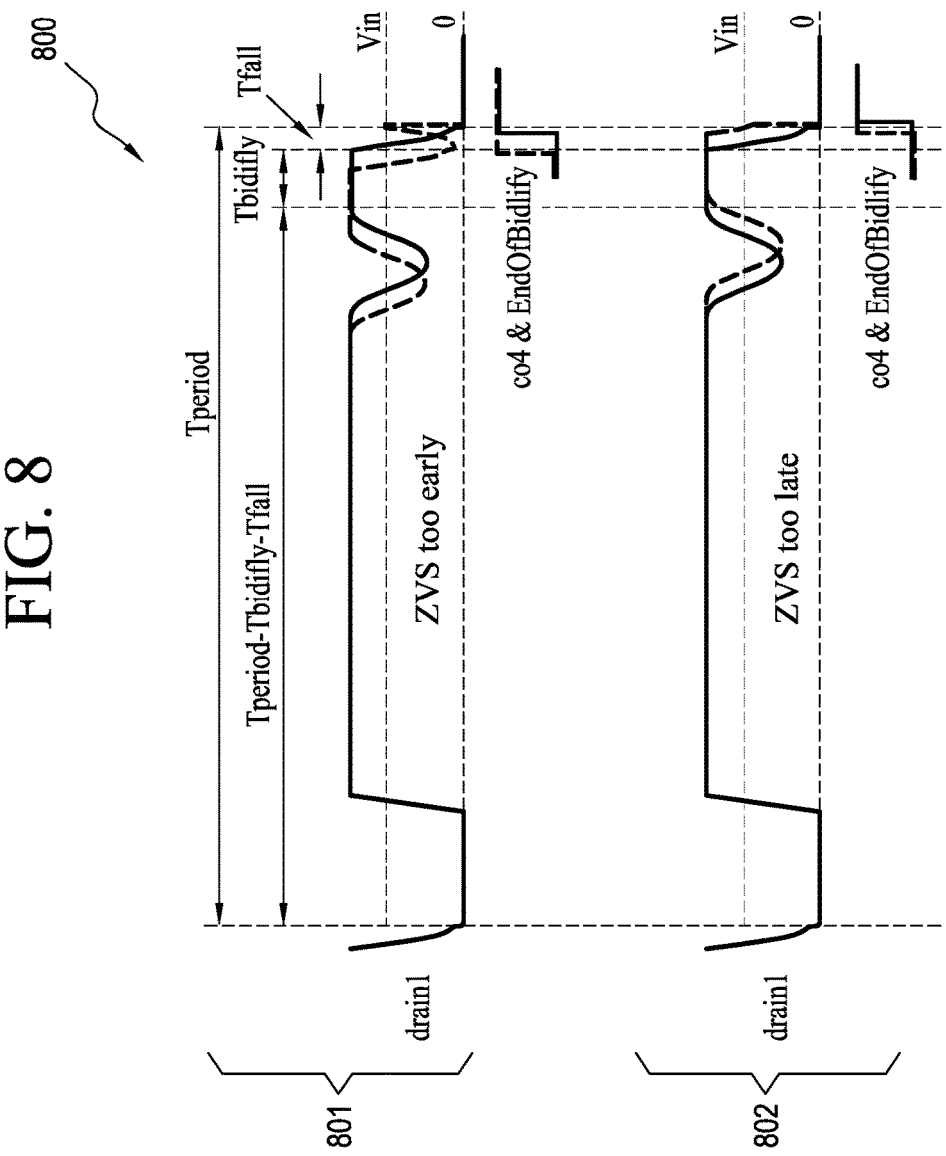
FIG. 8 illustrates a timing diagram for a first embodiment.

FIG. 8 illustrates a timing diagram 800 for a first embodiment. The objective for ZVS is that the valley of drain1 (or top of drain2) detected by the top_valley_detect matches with turn-on by the oscillator.

The on-time will be adapted by up/down counting with small steps if valley and turn-on are not at the same moment.

FIG. 8 illustrates a ZVS too early moment 801 and a ZVS too late moment 802. The on-time is in continuous regulation with small variation for matching the ZVS moment with the end of cycle for fixed frequency operation:

$$Ton_{N+1}=Ton_N+1t, \text{ if ZVS is too early; or}$$

$$Ton_{N+1}=Ton_N-1t, \text{ if ZVS is too late.}$$

The total expression for the on-time including power down and power up stepping and matching the ZVS moment is:

$$Ton_{N+1}=Ton_N-1t+2t*(co4 \text{ \& EndofBidifly})+PowerDown*-\delta Tring+PowerUp*\delta Tring.$$

The $Ton_N$ is the on-time of the finished cycle and $Ton_{N+1}$ of the next cycle.

The items co4, EndOfBidifly, PowerDown and PowerUp are binary variables [0 or 1].

The parameter t is a small-time step (for example, 20 ns).

δ is the primary on-time divided by the secondary stroke time.

Tring is the the ringing period.

In a second embodiment, if the time for the bidifly action is adjusted, a fixed switching frequency can be achieved.

Figure 9:
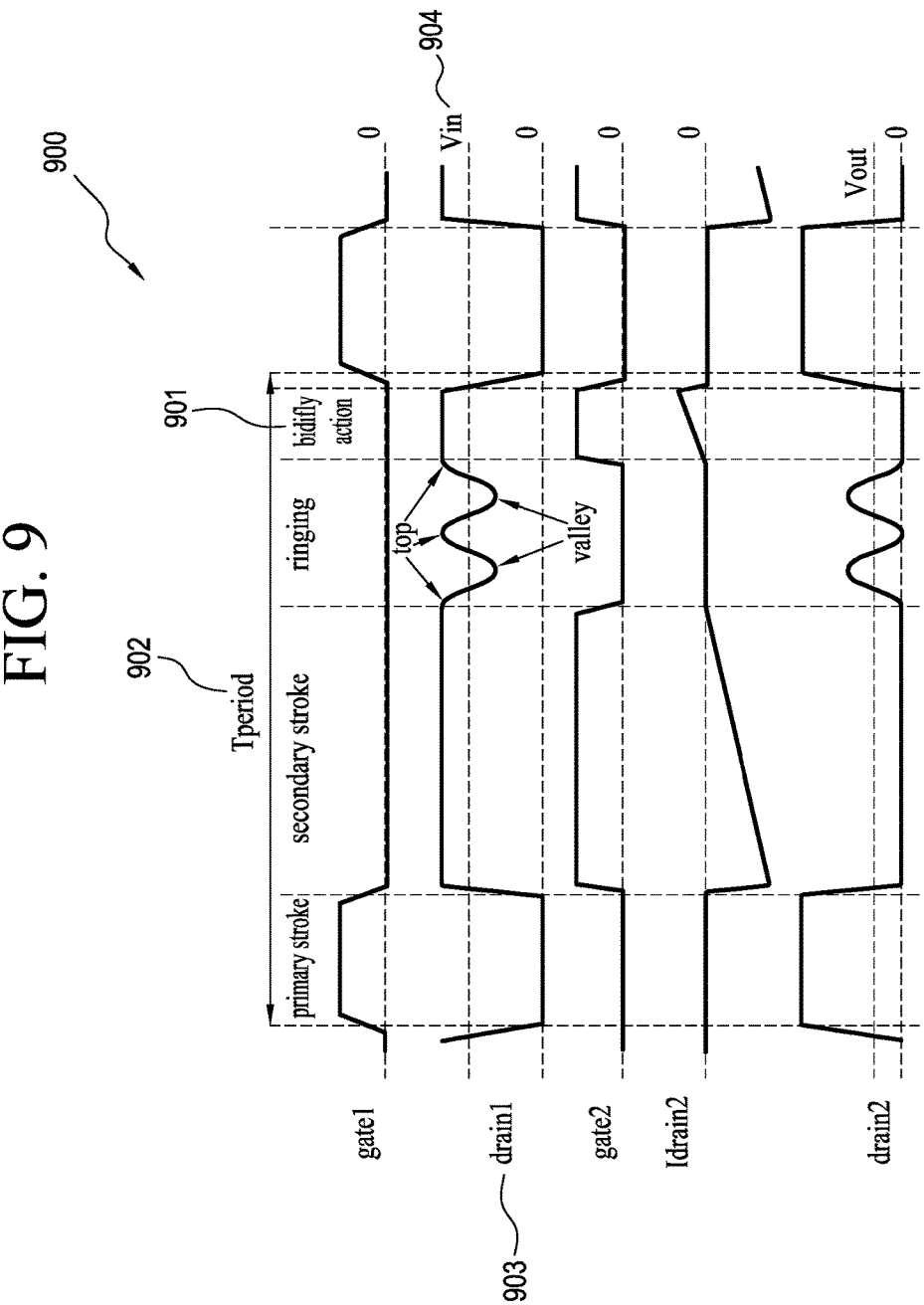
FIG. 9 illustrates timing diagram for bidifly action extension for a fixed frequency operation.

FIG. 9 illustrates a timing diagram 900 for bidifly action extension for a fixed frequency operation. The bidifly action time 901 is increased such that the time period matches the requested Tperiod 902.

As a consequence, the energy build up in transformer T1 is larger than required to achieve ZVS for MOSFET S1. The drain signal, drain1 903, drops to zero and the surplus energy is then converted back to the input 904 and the energy is converted back to the storage element C1 104).

Figure 10:
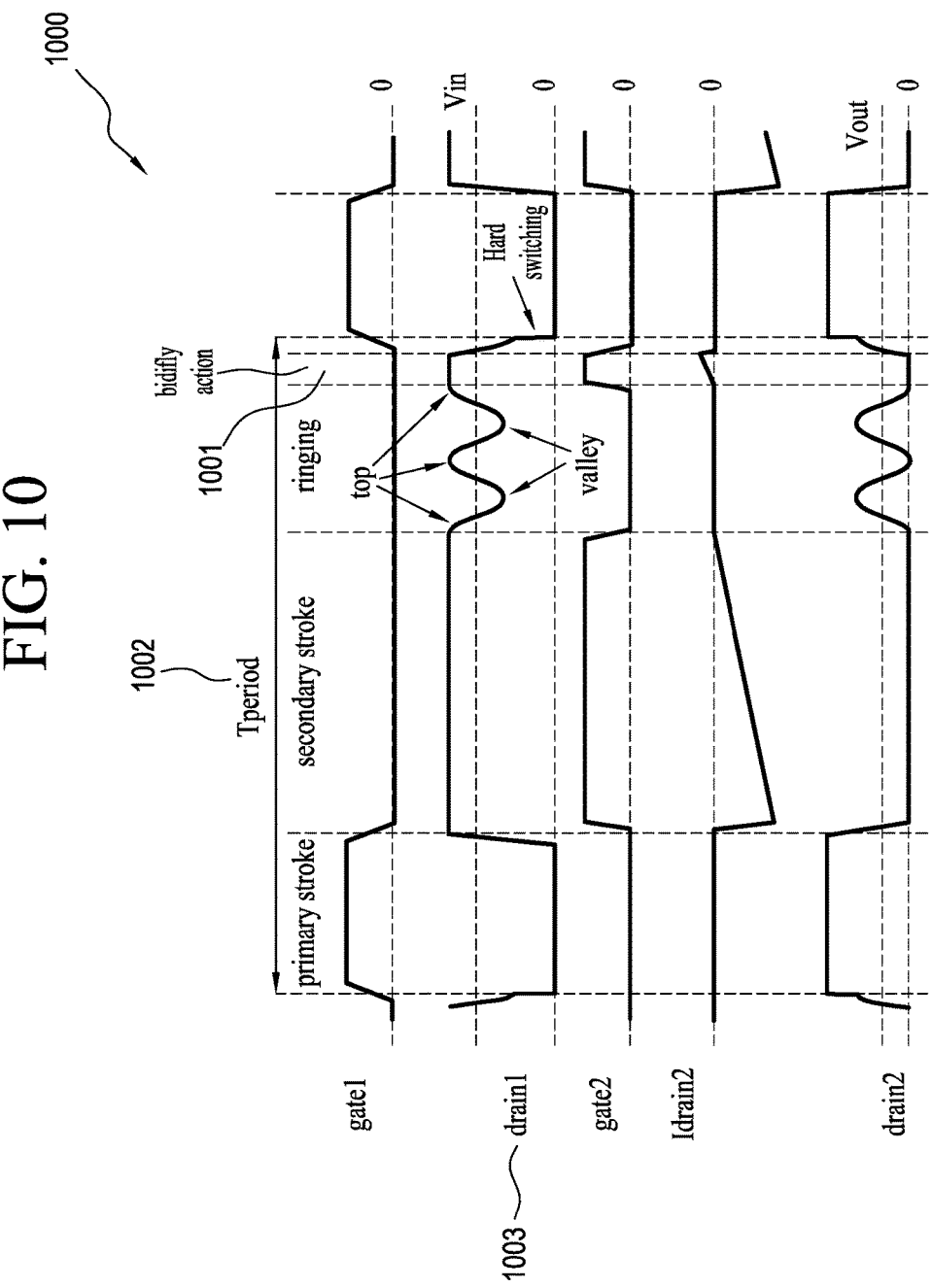
FIG. 10 illustrates a timing diagram for bidifly action reduction for a fixed frequency operation.

FIG. 10 illustrates a timing diagram 1000 for bidifly action reduction for a fixed frequency operation. The bidifly action time 1001 is reduced such that the time period matches the requested Tperiod. As a consequence, the energy build up in transformer T1 is smaller than required to achieve ZVS for MOSFET S1. MOSFET S1 is switched on while the drain1 1003 signal is not close to zero.

Only for certain output power levels is ZVS achieved without surplus energy being converted back to the input. For other power levels, the efficiency may be reduced due to non-ZVS switching or energy being converted back to the input.

If only the bidifly action is extended, as seen in FIG. 9, ZVS will be maintained for both switches MOSFET S1 and MOSFET S2 and switching losses will be minimal, however, conduction losses will increase.

Figure 11:
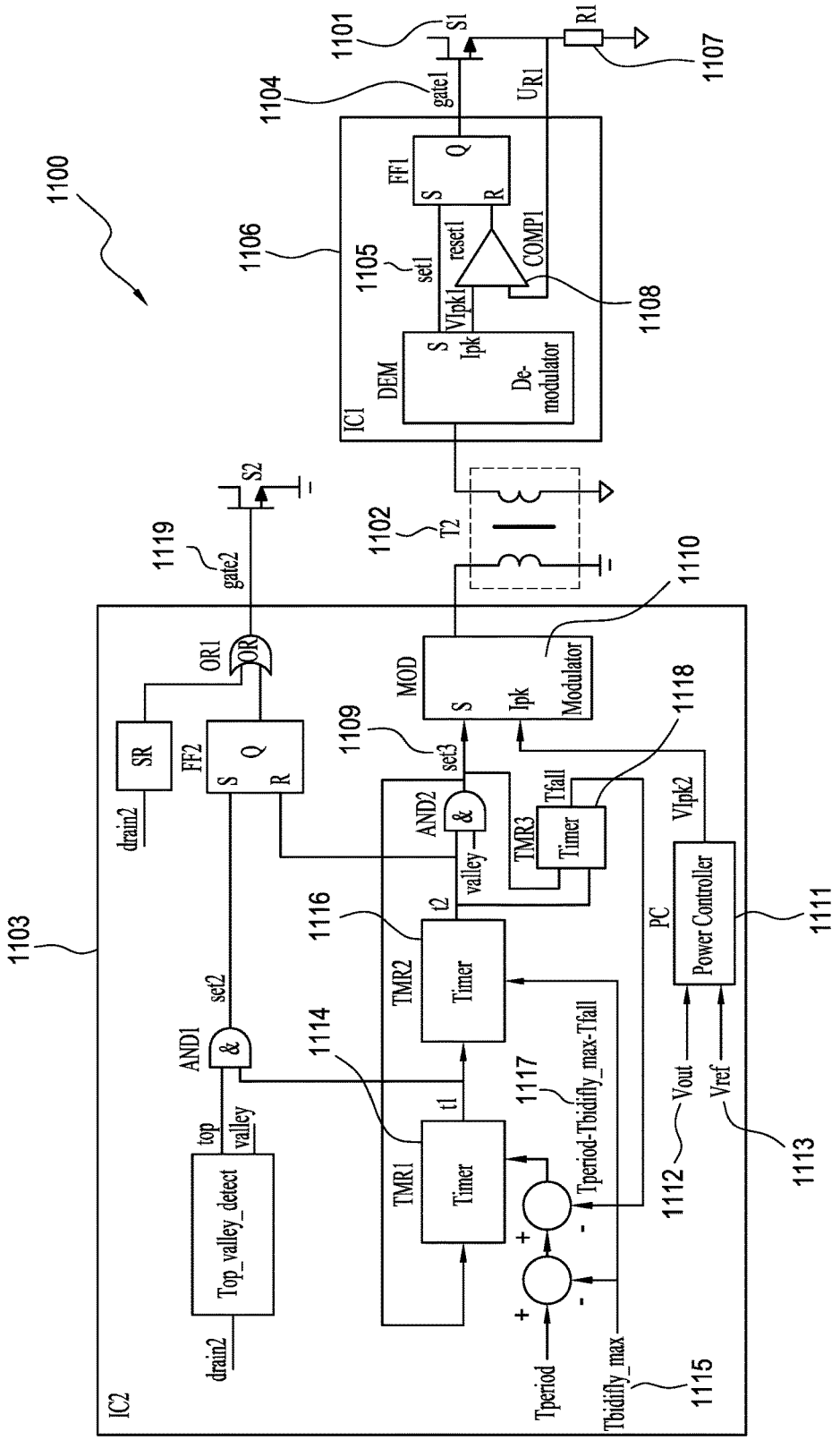
FIG. 11 illustrates a circuit diagram for a second embodiment.

FIG. 11 illustrates a circuit diagram 1100 for a second embodiment.

The primary side MOSFET S1 1101 is controlled from the secondary side 1103.

Secondary side IC2 1103 sends the signals for setting the gate voltage, gate1 voltage, and the peak current on which the gate needs to reset by the transformer T2 1102. After the gate 1104 is switched on by the set signal 1105, current will build up in transformer T1 1102 according to:

$$V_{in}=Lp*di/dt,$$

in which $V_{in}$ is the rectified input voltage and Lp is the primary side 1106 inductance of transformer T1 1102.

The voltage across resistor R1 1107 will be:

$$U_{R1}=i*R1.$$

As soon as $U_{R1}$=VIpk1, the comparator COMP1 1108 trips, and the primary stroke will end. The modulation and demodulation of the two signals, set3 1109 and Ipk 1110, may be done by frequency shift keying ("FSK") or pulse distance modulation.

The peak current is controlled by power controller PC 1111. The PC 1111 may be a traditional error amplifier comparing the output voltage $V_{out}$ 1112 with a reference voltage $V_{ref}$ 1113.

The fixed switching frequency is set to 1/Tperiod.

The set3 signal 1109 creates a set signal on the secondary side 1103, which is the set1 signal 1105 on the primary side 1106 with time period Tperiod.

The time period is split in three portions, which are the fall time, the maximum bidifly action time, and the time of timer TMR1 1114.

The fall time is the time for the drain1 signal to reach the (near) zero voltage after the bidifly action.

The maximum bidifly action time, Tbidifly_max 1115 is the time set equal to the time distance between the top signals, which is controlled by timer TMR2 1116.

The time of timer TMR1 1114, which is the set according to Tperiod minus the falltime Tfall and minus the maximum bidifly action time 1117.

The fall time is measured by timer TMR3 1118. If the fall time changes, for example, due to a change in input voltage, Vin, the switching frequency will not be on the target 1/Tperiod.

Timer TMR1 1114 will change setting for the next switching cycle, such that for the next switching cycle, the switching is back on target.

The gate of MOSFET S2, gate2 1119, is set on the first top after timer TMR1 1114 has tripped. The gate2 1119 signal is reset when timer TMR2 trips 1116.

For synchronous rectification, the synchronous rectifier controller circuit ("SR") may be included. The synchronous rectifier switches on gate2 1119 during the secondary stroke.

In a third embodiment, if ZVS for MOSFET S2 is not preserved, fixed frequency operation can also be achieved.

Figure 12:
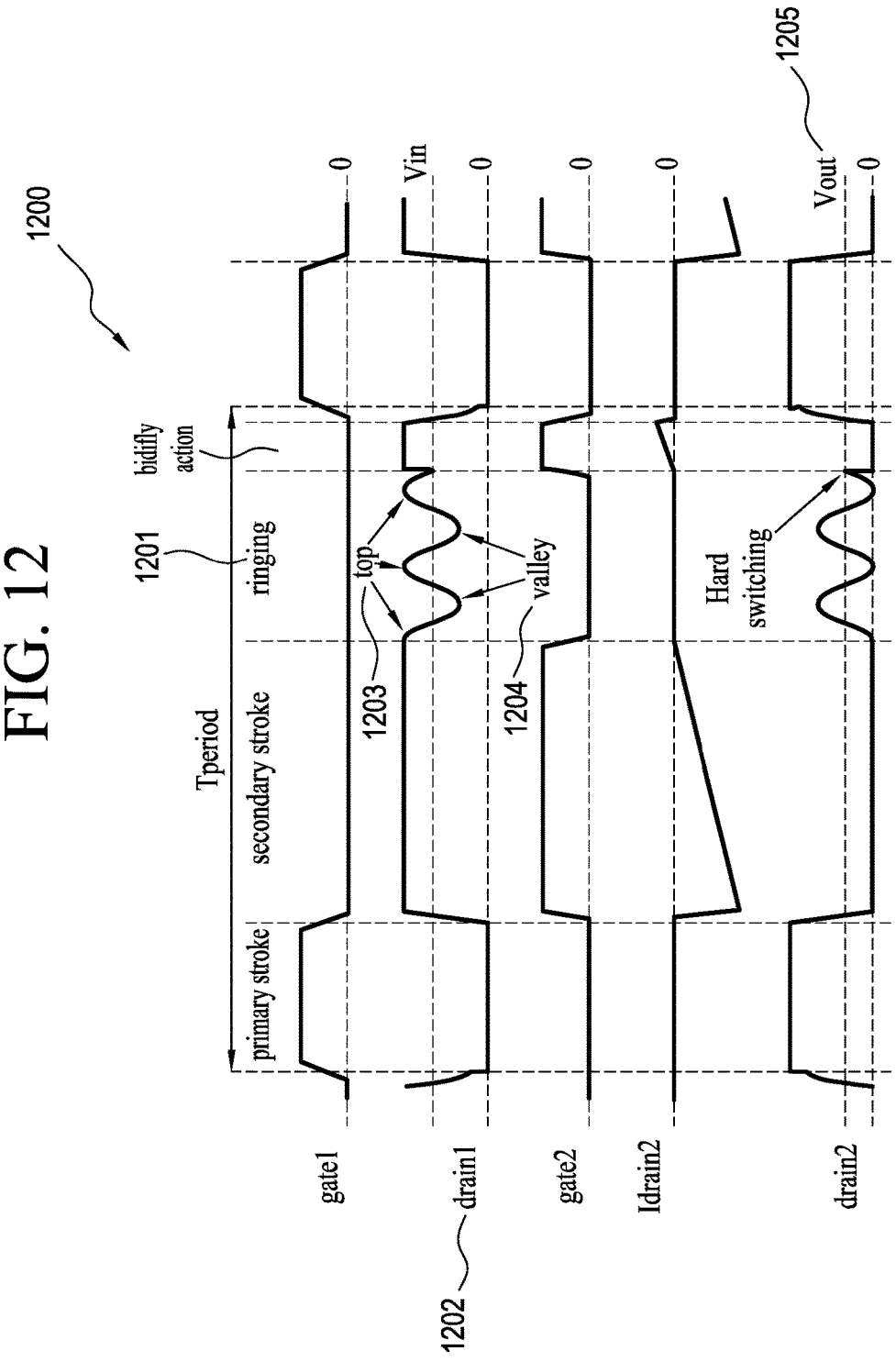
FIG. 12 illustrates a timing diagram for bidifly action with hard switching at the secondary side.

FIG. 12 illustrates a timing diagram 1200 for bidifly action with hard switching of the MOSFET S2. Hard switching of MOSFET S2 results in less power loss than hard switching MOSFET S1 because the hard switching voltage is lower at the secondary side of the converter. However, MOSFET S1 switches at zero voltage in this embodiment.

MOSFET S2 is switched on during the ringing period 1201 such that the switching frequency (=1/Tperiod) of the SMPS is at the target value.

The drain voltage, drain1 1201, may have a value between the top 1203 and the valley 1204 during the ringing period 1201, when MOSFET S2 is switched on for the second time in the converter cycle.

The output voltage 1205 ripple is not increased as in the first embodiment. The third embodiment has a fixed frequency and each cycle has the same peak current and is therefore a true fixed frequency.

Figure 13:
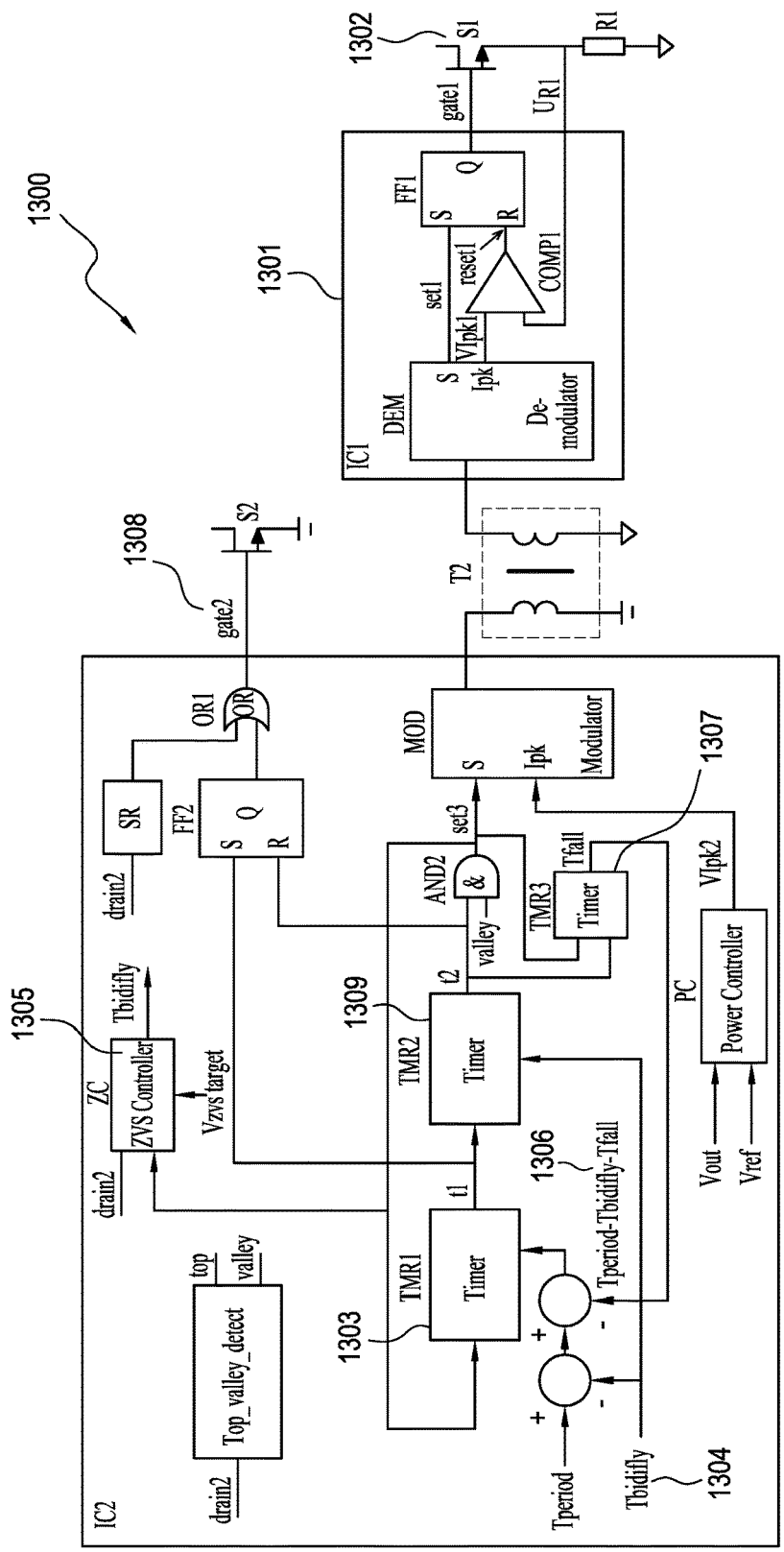
FIG. 13 illustrates a circuit diagram for the third embodiment.

FIG. 13 illustrates a circuit diagram 1300 for the third embodiment. The primary side 1301 MOSFET S1 1302 and the peak current are controlled as in the second embodiment.

The time period is split into three portions, the fall time, the bidifly action time, and the time of the timer TMR1 1303.

The fall time is the time for the drain1 signal to reach the (near) zero voltage after the bidifly action.

The bidifly action time, Tbidifly 1304 is the time set by the Zero Voltage Switch Controller, ZC 1305.

The time of timer TMR1 1303 is the set according to Tperiod minus the falltime, Tfall and minus the bidifly action time 1306.

The fall time is measured by timer TMR3 1307.

The gate of MOSFET S2, gate2 1308, is set after timer TMR1 1303 has tripped. The gate2 signal for gate2 1308 is reset when timer TMR2 1309 trips.

For synchronous rectification, a synchronous rectifier controller circuit, SR may be included.

The Zero Voltage Switch Controller, ZC 1305, regulates the switch-on voltage of MOSFET S1 1302 to a value close to zero.

Figure 14:
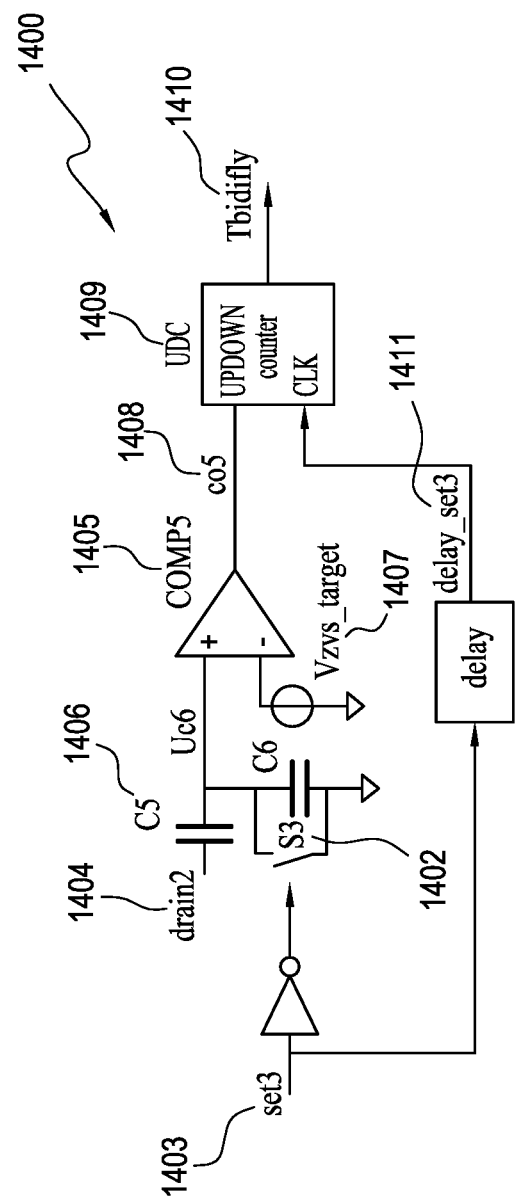
FIG. 14 illustrates a circuit diagram of a zero voltage switch controller.

FIG. 14 illustrates a circuit diagram of a zero voltage switch controller 1400.

Initially, capacitor C6 1401 is discharged to zero when switch S3 1402 is closed.

The set3 signal 1403 opens the switch S3 1402. After switch S3 1402 opens, the voltage change of the drain2 signal 1404 will be on the positive input of comparator COMP5 1405, with a ratio equal to $C_{C5}/(C_{C5}+C_{C6})$, in which $C_{C5}$ and $C_{C6}$ are the capacitance values of capacitor C5 1406 and capacitor C6 1401, respectively.

If the voltage change multiplied by the ratio is larger than the ZVS target value, Vzvs_target 1407, comparator COMP5 1405 will output a high co5 signal 1408.

If the voltage change multiplied by the ratio is smaller than the ZVS target value, Vzvs_target 1407, comparator COMP5 1405 will output a low co5 signal 1408.

The up-down counter, UDC 1409 may count up when the signal co5 1408 is high and count down when the co5 signal 1408 is low.

The clock for the UDC counter 1409 is the delayed set3 signal 1411. The delay is set to a value large enough that the COMP5 1405 output can respond, but is smaller than the time of the primary stroke, for example, the delay can be 300 ns in a typical system.

The Zero Voltage Switch Controller 1400 will make the Tbidifly 1410 time larger when the voltage change of the drain2 signal 1404 is large. The larger Tbidifly 1410 time will result in a smaller voltage change of the drain2 signal 1404 for the next switching cycle.

If the voltage change is small, Tbidifly 1410 will be made smaller for the next cycle.

The ZVS controller 1400 is regulating the voltage change of the drain2 signal 1404 at the switch on moment of switch S1 to a value equal to Vzvs_target*($C_{C5}$+$C_{C6}$)/$C_{C5}$, by adjusting the counter value up or down after every switching cycle.

For all three solutions, an embodiment is described below. Other embodiments with the same switching operation are possible. The embodiments are about a new switching operation where zero voltage switching in combination with fixed frequency operation is achieved.

Figure 15:
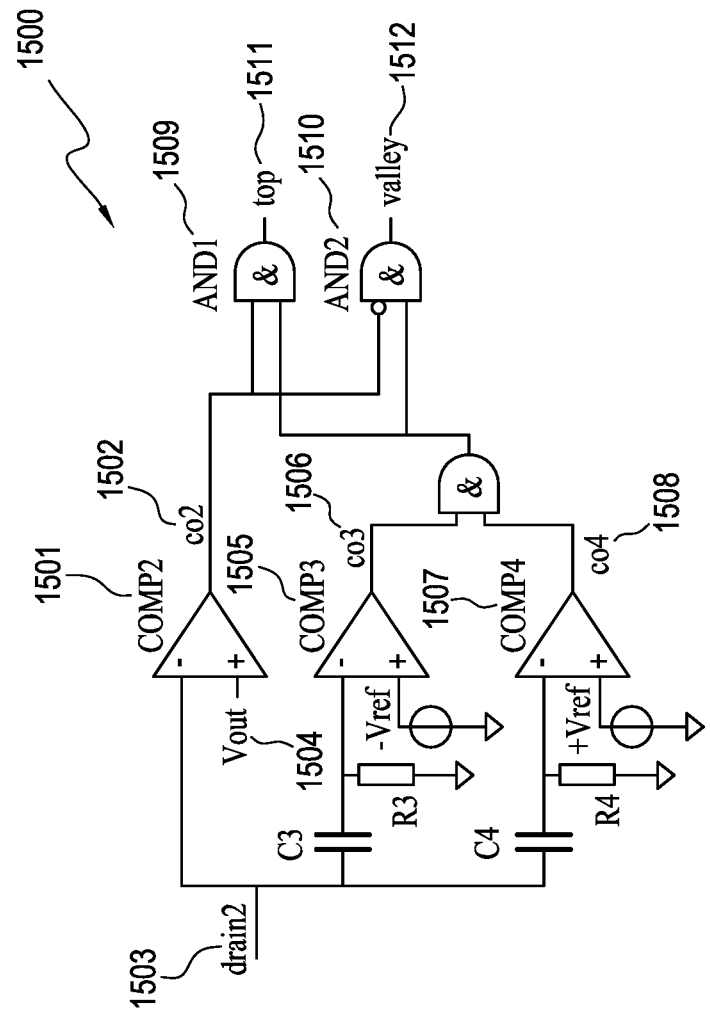
FIG. 15 illustrates a circuit diagram for a valley and top detection circuit.

FIG. 15 illustrates a circuit diagram for a valley and top detection circuit 1500. For all three embodiments, a valley and top detection circuit 1500 is needed.

Comparator COMP2 1501 outputs a signal co2 1502 which is high when drain2 1503 is below the output voltage $V_{out}$ 1504.

Comparator COMP3 1505 outputs a signal co3 1506 which is low when the dv/dt on drain2 1503 is smaller than −Vref/R3*C3.

Comparator COMP4 1507 outputs a signal co4 1508 which is low when the dv/dt on drain2 1503 is larger than Vref/R3*C3.

Combining the output signal co2 1502, output signal co3 1506 and output signal co4 1508 with AND1 1509 and AND2 1510 results in a top signal 1511 and a valley signal 1512.

Figure 16:
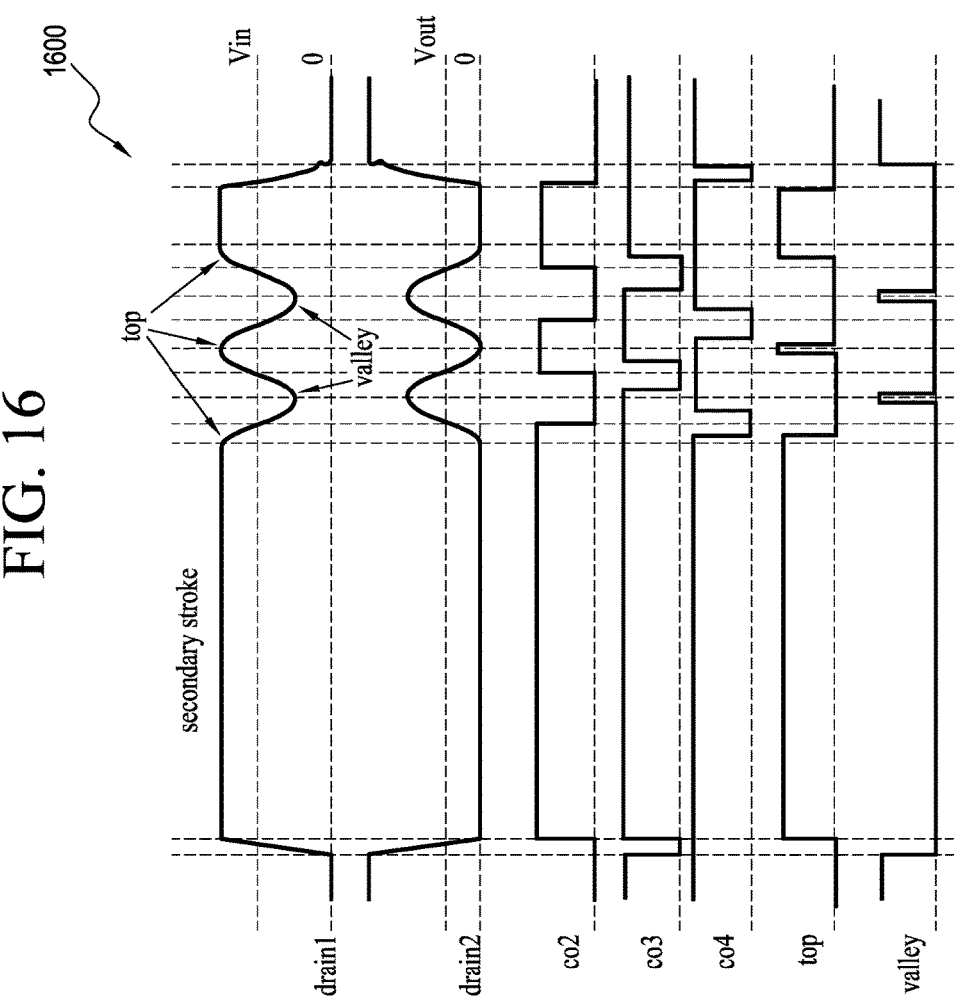
FIG. 16 illustrates a timing diagram 1600 for the valley and top detection circuit.

FIG. 16 illustrates a timing diagram 1600 for the valley and top detection circuit 1500. Tops and valley signals 1511, 1512 are valid after the secondary stroke has ended.

Figure 17:
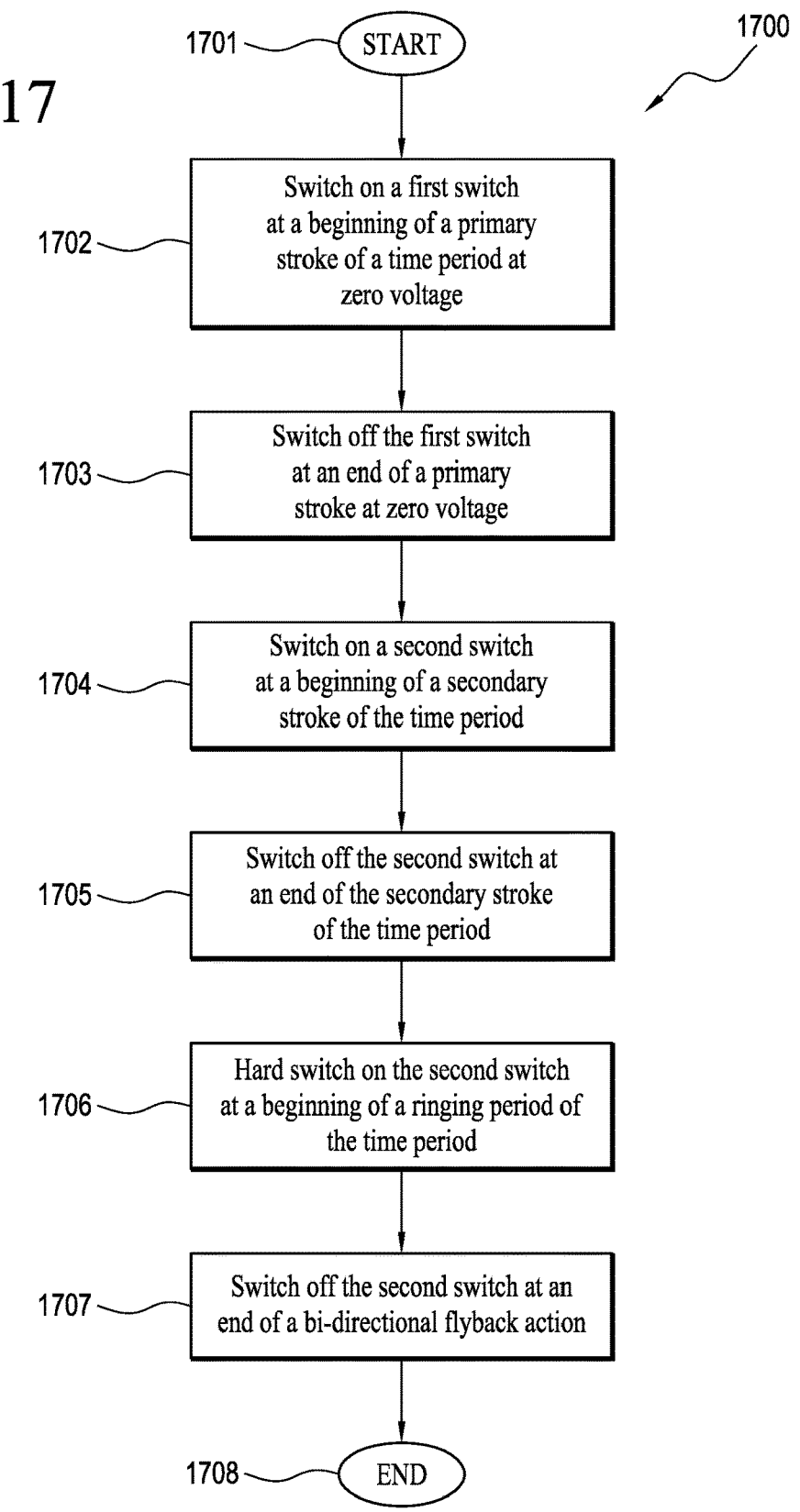
FIG. 17 illustrates a method for maintaining zero voltage switching while having a fixed switching frequency.

FIG. 17 illustrates a flow chart for a method of maintaining zero voltage switching while having a fixed switching frequency.

The method 1700 begins at step 1701.

The method 1700 then proceeds to step 1702 which switches on a first switch, on a primary side, at a beginning of a primary stroke of a time period at zero voltage.

The method 1700 then proceeds to step 1703 which switches off the first switch at an end of the primary stroke. The switch off criterion is a peak level of the primary current or an on-time of the primary switch.

The method 1700 then proceeds to step 1704 which switches on a second switch, on a secondary side, at a beginning of a secondary stroke of a time period.

The method 1700 then proceeds to step 1705 which switches off the second switch at an end of the secondary stoke of a time period.

The method 1700 then proceeds to step 1706 which switches on the second switch at an end of a ringing period of the time period. Step 1706 can be bypassed in quasi-resonant operation. The secondary switch stays on during the transition from the secondary stroke to the bidifly stroke.

The method 1700 then proceeds to step 1707 which switches off the second switch at an end of a bi-directional flyback action.

The method 1700 then ends at step 1708.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for maintaining zero voltage switching while having a fixed switching frequency, the method comprising steps of:
  switching on a first switch, on a primary side, at a beginning of a primary stroke of a time period at zero voltage and switching off the first switch at an end of the primary stroke;
  switching on a second switch, on a secondary side, at a beginning of a secondary stroke of the time period and switching off the second switch at an end of the secondary stroke of the time period; and switching on the second switch at an end of a ringing period of the time period and switching off the second switch at an end of a bi-directional flyback action.

2. The method for maintaining zero voltage switching while having the fixed switching frequency of claim 1,
wherein a gate of the second switch is on after a first timer trips.

3. The method for maintaining zero voltage switching while having the fixed switching frequency of claim 1,
wherein a gate of the second switch is reset after a second timer trips.

4. The method for maintaining zero voltage switching while having the fixed switching frequency of claim 1,
wherein the time period has a peak current within a predetermined tolerance.

5. The method for maintaining zero voltage switching while having the fixed switching frequency of claim 4,
wherein the time period has a fall time which ends the time period and begins a next time period, and
wherein the fall time is a time for the drain voltage of the first switch to reach zero voltage after the bi-directional flyback action.

6. The method for maintaining zero voltage switching while having the fixed switching frequency of claim 5,
wherein a time of the bi-directional flyback action is set by a zero voltage switch controller on the secondary side.

7. The method for maintaining zero voltage switching while having the fixed switching frequency of claim 4,
wherein a time of the first timer is the time period minus the fall time and minus a time of the bi-directional flyback action.

8. The method for maintaining zero voltage switching while having the fixed switching frequency of claim 7,
wherein the time period includes the primary stroke, the secondary stroke, the ringing period, and the bi-directional flyback action.

9. The method for maintaining zero voltage switching while having the fixed switching frequency of claim 1,
wherein the second switch remains on at an end of the secondary stroke of the time period and switches off at an end of the bi-directional flyback action.

10. A circuit for maintaining zero voltage switching while having a fixed switching frequency, the circuit comprising:
a primary side including a first switch configured to switch on at a beginning of a primary stroke of a time period at zero voltage and switch off at an end of the primary stroke;
a secondary side including a second switch configured to switch on at a beginning of a secondary stroke of the time period and switching off at an end of the secondary stroke of the time period; and
the second switch configured to switch on at an end of a ringing period of the time period and switching off at an end of a bi-directional flyback action.

11. The circuit for maintaining zero voltage switching while having the fixed switching frequency of claim 10,
wherein a gate of the second switch is on after a first timer trips.

12. The circuit for maintaining zero voltage switching while having the fixed switching frequency of claim 10,
wherein a gate of the second switch is reset after a second timer trips.

13. The circuit for maintaining zero voltage switching while having the fixed switching frequency of claim 10,
wherein the time period has a peak current within a predetermined tolerance.

14. The circuit for maintaining zero voltage switching while having the fixed switching frequency of claim 13,
wherein the time period has a fall time which ends the time period and begins a next time period, and
wherein the fall time is a time for a drain voltage of the first switch to reach zero voltage after the bi-directional flyback action.

15. The circuit for maintaining zero voltage switching while having the fixed switching frequency of claim 14,
wherein a time of the bi-directional flyback action is set by a zero voltage switch controller on the secondary side.

16. The circuit for maintaining zero voltage switching while having the fixed switching frequency of claim 13,
wherein a time of the first timer is the time period minus the fall time and minus a time of the bi-directional flyback action.

17. The circuit for maintaining zero voltage switching while having the fixed switching frequency of claim 14,
wherein the time period includes the primary stroke, the secondary stroke, the ringing period and the bi-directional flyback action.

18. The circuit for maintaining zero voltage switching while having the fixed switching frequency of claim 10,
wherein the second switch remains on at an end of the secondary stroke of the time period and switches off at an end of the bi-directional flyback action.

19. A circuit for maintaining primary side zero voltage switching while having a fixed switching frequency comprising:
a coupled inductor with a primary side winding and a secondary side winding,
wherein the primary side winding is coupled to an input node and
wherein the secondary side winding is configured to be coupled to an output node;
a first switch connected to the primary side winding of the coupled inductor,
wherein the secondary side winding of the coupled inductor is also configured to be coupled to a second switch;
a control circuit connected to the first switch and configured to be coupled to the second switch,
wherein the control circuit is configured to generate control signals for the first switch and the second switch,
wherein the control circuit maintains zero voltage switching at the primary side; and
wherein the control signals include:
switching on the first switch at a beginning of a primary stroke of a time period at zero voltage and switching off the first switch at an end of the primary stroke;
switching on the second switch at a beginning of a secondary stroke of the time period and switching off the second switch at an end of the secondary stroke of the time period; and
switching on the second switch at an end of a ringing period of the time period and switching off the second switch at an end of a bi-directional flyback action.

20. The circuit for maintaining primary zero voltage switching of claim 19,
wherein the control circuit operates with a variable power level.

21. The circuit for maintaining primary zero voltage switching of claim 19, wherein the control circuit allows switching at a secondary side.

* * * * *